United States Patent [19]

Hermann et al.

[11] Patent Number: 4,970,253
[45] Date of Patent: Nov. 13, 1990

[54] THERMOPLASTIC PLASTICIZED POLYVINYLBUTYRAL MOLDING COMPOSITION

[75] Inventors: Hans Dieter Hermann; Kurt Fock, both of Bad Soden am Taunus; Klaus Fabian, Kriftel, all of Fed. Rep. of Germany

[73] Assignee: Hoechst AktiengesellschaftZentrale Patentabteilung, Frankfurt, Fed. Rep. of Germany

[21] Appl. No.: 117,911

[22] Filed: Nov. 3, 1987

Related U.S. Application Data

[63] Continuation of Ser. No. 762,825, Aug. 6, 1985, abandoned.

[30] Foreign Application Priority Data

Aug. 10, 1984 [DE] Fed. Rep. of Germany ....... 3429441

[51] Int. Cl.$^5$ .............................................. C08K 5/09
[52] U.S. Cl. .................................. 524/296; 524/297; 524/314; 525/61
[58] Field of Search ....................... 524/297, 296, 314; 525/61

[56] References Cited

U.S. PATENT DOCUMENTS

| 3,153,009 | 10/1964 | Rombach | 525/56 |
| 3,926,918 | 12/1975 | Shibata et al. | 525/61 |
| 4,205,146 | 5/1980 | Hermann | 525/61 |
| 4,452,935 | 6/1984 | Nomura et al. | 525/61 |

FOREIGN PATENT DOCUMENTS

| 0120274 | 8/1945 | Canada | 525/61 |
| 0568579 | 1/1959 | Canada | 525/61 |
| 2365005 | 7/1974 | Fed. Rep. of Germany | 525/61 |
| 2355689 | 5/1975 | Fed. Rep. of Germany | 525/61 |
| 0008384 | 5/1964 | Japan | 525/61 |
| 0030706 | 2/1983 | Japan | 525/61 |
| 0217503 | 12/1983 | Japan | 525/61 |
| 00154031 | 1/1984 | Japan | 525/61 |
| 0418487 | 8/1974 | U.S.S.R. | 525/61 |
| 0568914 | 4/1945 | United Kingdom | 525/61 |
| 2007677 | 5/1979 | United Kingdom | |

OTHER PUBLICATIONS

"Production and Properties of Aqueous Polyvinyl Alcohol Solutions"; Harreus et al.; pp. 24–30; Sep. 1983.

Primary Examiner—Joseph L. Schofer
Assistant Examiner—J. M. Reddick
Attorney, Agent, or Firm—Berman, Aisenberg & Platt

[57] ABSTRACT

Thermoplastic plasticized polyvinylbutyral molding compositions, in particular films of improved tensile strength and reduced tackiness are prepared by acetalization of polyvinyl alcohol, capable of association, in the associated state with n-butyraldehyde in aqueous phase in the presence of an acid catalyst and, if appropriate, of an organic sulfonic acid having an emulsifying action, after-treatment of the polyvinylbutyral under acetalization conditions at an elevated temperature in the presence of an organic sulfonic acid having 8 to 30 C atoms and having an emulsifying action, isolation and/or purification of the polyvinylbutyral and, if appropriate, admixture of conventional additives and mixing of the product, which may have been dried, with up to 40% by weight of plasticizer, relative to the polymer/plasticizer mixture, and molding, the plasticizers employed being esters of phthalic acid with $C_6$–$C_{10}$-alcohols and/or esters of adipic acid with $C_6$–$C_{10}$-alcohols.

Use of the films for the manufacture of laminated glass, and laminated glass containing the films as the joining layer.

13 Claims, No Drawings

THERMOPLASTIC PLASTICIZED POLYVINYLBUTYRAL MOLDING COMPOSITION

This application is a continuation of Ser. No. 762,825, filed Aug. 6, 1985 now abandoned.

The invention disclosed and claimed in this application is related to that disclosed and claimed in Application Ser. No. 762,825, filed Aug. 6, 1985, now U.S. Pat. No. 4,751,266

The invention relates to thermoplastic plasticized polyvinylbutyral molding compositions, in particular high-strength films of improved tensile strength and reduced tackiness, to a process for their preparation and to the use of the films as the linking interlayer in the manufacture of laminated glass.

As is known, polyvinylbutyral has been used for a long time together with plasticizer for the preparation of interlayers in laminated glass. Even though plasticized polyvinylbutyral films have already reached a considerable degree of usefulness and enable laminated glass of high quality to be produced, there is still a considerable interest in technical improvements. The dominant plasticizers at present are especially esters of triethylene glycol with aliphatic monocarboxylic acids. They are well compatible with polyvinylbutyral having a vinyl alcohol unit content of up to 21% by weight and even higher and give films having good mechanical properties. However, the adhesion of these films to glass is too strong and must be reduced in a controlled manner to a practical value by the addition of anti-adhesive agents, and this sometimes causes difficulties. In addition, the above plasticizers are not readily accessible and hence relatively expensive.

For the last few years, films have also been produced which contain less expensive plasticizers. Thus, for example, a film has been disclosed which contains a mixture of phthalic acid and phosphoric acid esters instead of triglycol esters. Even with this film, reproducible adjustment of the adhesion to glass is not always easy. Another approach is the use of an adipic acid ester, for example dihexyl adipate, as the plasticizer. This plasticizer is sufficiently compatible with polyvinyl butyral only if the vinyl alcohol unit content in the polymer is lowered to about 18–19% by weight. However, films which contain the usual plasticizer concentration of about 30% by weight in the polymer/plasticizer mixture are insufficiently strong when dihexyl adipate is used. This makes it necessary to reduce the plasticizer content. Although this leads to good quality films, these have relatively poor flow during production, i.e. they require a high energy consumption.

Similar comments apply to the use of the particularly easily accessible phthalic acid esters as the plasticizers. Here again, it is necessary to employ polyvinylbutyrals with a low vinyl alcohol unit content, and this gives films of reduced strength and increased tackiness, which are not very useful technically.

There is therefore a demand for films of plasticized polyvinylbutyral, which can readily be processed, have a high strength and are not too tacky and which can contain adipic acid esters and/or phthalic acid esters as the plasticizers and the adhesion of which to glass does not need to be adjusted in an involved manner or is at least readily adjustable.

Overcoming the known problems and disadvantages, a process has now been found, surprisingly, for the preparation of thermoplastic plasticized polyvinylbutyral molding compositions by acetalization of polyvinyl alcohol with n-butyraldehyde in aqueous phase in the presence of an acid catalyst and, if appropriate, an organic sulfonic acid having an emulsifying action, and aftertreatment of the polyvinylbutyral under acetalization conditions at an elevated temperature in the presence of a compound having an emulsifying action, isolation and/or purification of the polyvinylbutyral and, if appropriate, admixture of conventional additives and mixing the product, which may have been dried, with up to 40% by weight of plasticizer, relative to the polymer/plasticizer mixture, and molding, which process comprises using a polyvinyl alcohol, which is capable of association, in the associated state for the acetalization and performing the acetalization initially at a temperature below 20° C. and later at a temperature from 20° to above 40° C., performing the subsequent after-treatment of the polyvinylbutyral in the presence of an organic sulfonic acid having 8 to 30 C atoms and having an emulsifying action, or one of its salts, at 50° to 70° C. for 0.5 to 10 hours, and employing as the plasticizer (a) an ester of phthalic acid with a linear or branched $C_6$-$C_{10}$-alcohol or mixtures of these alcohols and/or
(b) an ester of adipic acid with a linear or branched $C_6$-$C_{10}$-alcohol or mixtures of these alcohols in a total quantity of 20 to 40% by weight.

According to the invention, the polyvinyl alcohol employed for the acetalization contains less than 1% by weight, preferably 0 to 0.5% by weight, of vinyl acetate units.

In a particularly preferred process variant, the starting material is polyvinyl alcohol which contains more than 1% by weight, preferably 1 to 5% by weight, of vinyl acetate units, and this polyvinyl alcohol is treated in aqueous solution at an elevated temperature, preferably between 50° and 100° C., with a stoichiometric quantity of alkali until the desired vinyl acetate unit content has been reached, and the polyvinyl alcohol saponified in this way is then acetalized in the associated state in the aqueous solution.

Any desired polyvinyl alcohols can be used as the starting components, provided that they can form associates in aqueous solution.

The polyvinyl alcohol capable of association can be brought, before the acetalization, into the required associated state by keeping its aqueous solution preferably for at least 10 minutes at a low temperature, preferably below 40° C., in particular at 15° to 20° C.

The presence of an associate to be employed according to the invention can easily be detected by the rise in viscosity shown on subsequent standing by the aqueous polyvinyl alcohol solution after heating to a temperature of 90° to 100° C. and cooling to room temperature.

A further condition is that the aqueous solutions of the associated polyvinyl alcohol are still capable of flow under acetalization conditions.

On the other hand, it is admittedly known from European Patent No. 0,000,699 that the intermolecular forces in polyvinylbutyral can be enhanced by after-treating the polyvinylbutyral in aqueous phase under acetalization conditions in the presence of 0.01 to 0.5% by weight, relative to polyvinylbutyral, of an organic sulfonic acid having an emulsifying action, at an elevated temperature for several hours. However, this process did not prove to be suitable for solving the present problem and, for example, even an increase in the concentration of the organic sulfonic acid, having an emulsifying action, in the after-treatment was not successful.

Surprisingly, however, the object can be achieved when the starting material used is a polyvinyl alcohol capable of association, the latter is brought into an associated state before the acetalization and is then reacted with n-butyraldehyde under conditions which do not, or at most partially, cause redissociation of the associates. During the acetalization reaction, according to the invention, of the polyvinyl alcohol in the associated state in aqueous phase, surprisingly the hydrogen bonds between the associated polyvinyl alcohol molecules are evidently preserved, and sometimes even up to maximum temperatures of 50° to 70° C., and effect a durable partial physical crosslinking in the resulting polyvinylbutyral.

The increase in hydrogen bonds can, for example, be detected by a broadening of the OH band in the infrared spectrum.

As already mentioned, the required association of the polyvinyl alcohol can very simply be achieved by leaving the aqueous solution of a polyvinyl alcohol, which contains at most 1% by weight, preferably at most 0.5% by weight, of vinyl acetate units, to stand at temperatures below 50° C. for up to 24 hours, preferably up to 2 hours.

In a particularly preferred embodiment, the starting material is a polyvinyl alcohol which contains more than 1% by weight, preferably 1 to 5% by weight, of vinyl acetate units and which is treated in aqueous solution with stoichiometric quantities of alkali, for example sodium hydroxide solution or potassium hydroxide solution, preferably between 50° and 100° C. and preferably for 5–60 minutes, until the vinyl acetate unit content in the polyvinyl alcohol has been reduced to the desired value, preferably to at most 0.8% by weight. If necessary, the saponified polyvinyl alcohol solution is left to stand, preferably at temperatures between 0° and 40° C., for up to 24 hours or longer, in order to effect sufficient association of the polymer. Particularly in the case of complete saponification, however, the storage can also be reduced down to 5 to 10 minutes. Moreover, it is not always necessary to saponify all the polyvinyl alcohol which is to be reacted with butyraldehyde. Sometimes it even suffices when more than 20% by weight of the polyvinyl alcohol contains preferably less than 0.5% by weight of vinyl acetate units. However, even in these cases, the average vinyl acetate unit content in the total polyvinyl alcohol intended for acetalization should be below 1% by weight, relative to the total quantity of polyvinyl alcohol. Subsequent to the saponification and, if so, storage of the aqueous polyvinyl alcohol solution, the acetalization of the polyvinyl alcohol takes place in aqueous phase under the usual conditions, the polyvinyl alcohol being preferably reacted initially below 20° C., and later above 20° C., with n-butyraldehyde in the presence of 0.1 to 5% by weight of a mineral acid (relative to the aqueous phase), for example hydrochloric acid, sulfuric acid or nitric acid.

The aftertreatment of the polyvinylbutyral with an organic sulfonic acid having an emulsifying action preferably follows the acetalization immediately and is carried out in accordance with the method disclosed by European Patent 0,000,699. For this purpose, the polyvinylbutyral in a finely divided form—the particle size should preferably be below 1 mm to the extent of 90%—is stirred in aqueous phase under acetalization conditions for 0.5 to 10 hours, preferably 1 to 7 hours, at temperatures from 50° to 70° C. in the presence of an organic sulfonic acid having 8 to 30 C atoms and having an emulsifying action, or of a salt of such a sulfonic acid. Corresponding to the usual conditions of acetalization, about 0.1 to 5% by weight (relative to the aqueous phase) of mineral acid are also present.

As in the process of European Patent No. 0,000,699, the required concentration of sulfonic acid having an emulsifying action can be up to 1% by weight, preferably 0.01 to 0.5% by weight, in particular 0.05 to 0.4% by weight (relative to polyvinylbutyral). The treated polymer should contain a fraction of 15 to 21% by weight, preferably 16 to 20% by weight, of vinyl alcohol units, since adequate compatibility of the polyvinylbutyral with plasticizer is preferentially ensured in this region. The fraction of vinyl acetate units in the polyvinylbutyral should be 0 to 1% by weight, preferably 0 to 0.5% by weight. During the aftertreatment, corresponding to the usual conditions of acetalization, such a quantity of nbutyraldehyde is present that the contents of vinyl alcohol units are not above or below the indicated values. Subsequent to the aftertreatment, the polyvinylbutyral is separated off from the aqueous phase, washed in the usual manner until neutral and, preferably by known methods, treated with a small quantity of alkali and dried. The viscosity of the polyvinylbutyral aftertreated in this way should be between 10 and 200 mPa.s, preferably between 50 and 150 mPa.s, measured according to DIN 53015 on a 5% by weight solution in ethanol at 23° C.

The plasticizers used are employed in a concentration of preferably 20 to 40% by weight, in particular 25 to 35% by weight, relative to the mixture.

The following plasticizers are particularly suitable according to the invention:

(a) Esters of phthalic acid with linear or branched aliphatic alcohols having 6 to 10 C atoms, such as, for example, hexanol, octanol or isodecanol and mixtures of these alcohols. Minor quantities, preferably less than 10% by weight (relative to the plasticizer), of phthalic acid esters of higher or lower alcohols can also be present.

(b) Esters of adipic acid with linear or branched aliphatic alcohols having 6 to 8 C atoms, such as, for example, hexanol, octanol and mixtures of these alcohols. Minor quantities, preferably less than 10% by weight (relative to the plasticizer), of esters of adipic acid with higher or lower alcohols can also be present.

With increasing chain length of the alcohol component, the compatibility of the plasticizers with polyvinylbutyral decreases. On the other hand, the compatibility of a particular plasticizer increases with decreasing vinyl alcohol unit content in the polyvinylbutyral. By reference to these property features, it is readily possible to establish the optimum composition of a polymer/plasticizer mixture. It is then desirable to employ those polymer/plasticizer mixtures which are as close as possible to the compatibility limit but in which exudation of the plasticizer is reliably prevented.

The mixing ratio of the plasticizer components given under (a) and (b) is by itself not critical. Preferably, the weight ratio is (a) : (b)=100 to 90:0 to 10, or 0 to 10 : 100 to 90. The known esters of triethylene or tetraethylene glycol with aliphatic $C_6$–$C_8$-carboxylic acids, sebacic acid esters, phosphoric acid esters and the like can also be added in minor quantities, preferably less than 10% by weight relative to the plasticized polymer.

Before or during the processing of the plasticized polyvinylbutyral into moldings, substances can be added which stabilize the mixture against degradation, for example small quantities of alkali or salts having an alkaline reaction, and also oxidation stabilizers, such as, for example, phenols substituted in the 2-, 4- and/or 6-position, bisphenols or terpene phenols.

Finally, the mixtures can also contain additives which affect the adhesion of the films to one another or to glass, such as, for example, salts of carboxylic acids, fluorides, lecithins or alkyleneureas.

Both the stabilizers mentioned and the additives for affecting the adhesion are usually added in quantities of 0.001 to 1% by weight, relative to the total mixture.

The polyvinylbutyral, plasticizer and, if appropriate, additives are mixed in a known manner by stirring them together and, if appropriate, leaving the mixture to stand, or by kneading or milling at an elevated temperature or alternatively directly during the processing on the calender or in the extruder and are processed in the conventional manner, preferably by extrusion, into thermoplastic moldings, preferably a 0.05 to 3 mm, in particular 0.3 to 2 mm, thick film.

The production of laminated glass, using the composite films prepared according to the invention, can be carried out by conventional methods, for example by compressionmolding between two glass sheets at 120° to 160° C. and under 5 to 20 bar.

Plasticized thermoplastic polyvinylbutyral molding compositions and films, produced according to the invention from associated polyvinyl alcohol, in particular films of high strength with improved tensile strength and reduced tackiness, are themselves novel and, as such, are also subjects of the invention.

Further subjects of the invention are also the use of plasticized thermoplastic polyvinylbutyral molding compositions according to the invention in the form of thermoplastic films of improved tensile strength and reduced tackiness for the manufacture of laminated glass, and also laminated glass containing the latter films as the joining layer.

The invention is illustrated in more detail by the Examples which follow.

EXAMPLE 1

(a) according to the invention 1,000 parts by weight of a 10% by weight solution of polyvinyl alcohol (=PVAl) (degree of polymerization $P_n$ about 1,400, 1.8% by weight of vinyl acetate units) are stirred at 90° C. for 30 minutes in the presence of 9.3 parts by weight of 10% by weight sodium hydroxide solution. The vinyl acetate unit content in the polyvinyl alcohol is reduced to 0.1% by weight by this treatment. The solution is cooled to 16° C., and 105 parts by weight of concentrated hydrochloric acid and 0.6 part by weight of sodium dodecylbenzenesulfonate are added. After a preceding cooling period of 30 minutes, 65 parts by weight of n-butyraldehyde are continuously added to this solution within 30 minutes at 16° C. The mixture is stirred for a further 30 minutes at 16° C. and the batch is then heated in 2 hours to 52° C. and stirred for a further 3 hours at this temperature. Subsequently, the mixture is cooled to room temperature, the polyvinylbutyral (=PVB) which has precipitated is filtered off and washed with water until neutral. Thereupon, the polymer is stirred for 1 hour at 60° C. with 740 parts by weight of water and 2.5 parts by weight of 10% by weight aqueous sodium hydroxide solution, filtered and dried in vacuo at 40° C. The polymer is mixed with 30% by weight (relative to the mixture) of di2-ethylhexyl phthalate and extruded to give a 0.8 mm thick film. Some properties of the polymer and of the film prepared from it are given in Table 1.

(b) (comparison)

Experiment (a) is repeated. However, in contrast to(a), the acetalization is carried out in the absence of dode-cylbenzenesulfonate. In other respects, the preparation of the polymer and the processing to give a film do not differ from (a) properties of the polymer and of the film prepared from it are shown in Table 1.

(c) (comparison)

Experiment (a) is repeated. As in (b), the acetalization is here carried out in the absence of dodecylbenzenesulfonate. In addition, the polyvinyl alcohol employed for the acetalization is not pretreated with alkali. In other respects, the preparation of the polymer, and the processing to give a film do not differ from(a). Some properties of the polymer and of the film prepared from it are shown in Table 1.

TABLE 1

| Example | Polymer | | | Film | | | | |
|---|---|---|---|---|---|---|---|---|
| | Vinyl acetate units in the starting PVA[1] (% by weight) | Na-dodecylbenzenesulfonate in the acetalization (parts) by weight | Vinyl alcohol units in the PVB (% by weight) | Melt index | | Tensile strength[3] (N/mm$^2$) | Strength at 100% elongation[3] (N/mm$^2$) | Compatibility with plasticizer |
| | | | | $i_2$ 190° C.[1] (g/10 min.) | $i_{20}$ 80° C.[2] (mg/hour) | | | |
| (a) (according to the invention) | 0.1 | 0.6 | 16.1 | 3.1 | 450 | 24 | 2.1 | yes |
| (b) (comparison) | 0.1 | 0 | 17.0 | 2.0 | 620 | 24 | 1.5 | yes |
| (c) (comparison) | 1.8 | 0 | 16.6 | 3.2 | 1560 | 19 | 1.3 | yes |

[1]Determination according to DIN 53735 at 190° C. under a load of 2.16 kg
[2]Determination according to DIN 53735 at 80° C. under a load of 21.6 kg
[3]Determination according to DIN 53455 after conditioning at 23° C. and 50% relative humidity, drawing rate 20 cm/minute, clamping length 50 mm, width of the measurement strip 15 mm.

Example 1 shows that the polymer (a) according to the invention gives films which are of higher strength than the comparison products (b) and (c) and have better flowability at 80° C.

EXAMPLE 2

(a) according to the invention

A polyvinyl alcohol having a degree of polymerization $P_n$ of about 1,300 and a vinyl acetate unit content of 2.2% by weight is completely saponified in 10% by weight solution at 80° C. by the addition of sodium hydroxide. 1,000 parts by weight of this solution are then cooled to 14° C. and treated with 110 parts by weight of 36% by weight hydrochloric acid and 0.65 part by weight of sodium pentadecylsulfonate. Within 20 minutes, 63.7 parts by weight of n-butyraldehyde are continuously added to this solution. Stirring is continued at 14° C. for 1 further hour, and the batch is then heated in 2.5 hours to 60° C. and kept for 3 hours at this temperature. The polymer is then worked up as indicated in Example 1.

(b) (comparison)

A polyvinylbutyral is prepared from the same starting polyvinyl alcohol in the same way as in Example 2(a). In contrast to 2(a), however, this polyvinyl alcohol is not further saponified. Moreover, 63.0 parts by weight of n-butyraldehyde are employed in the acetalization.

The polymers from 2(a) and 2(b), each together with 30% by weight of a plasticizer (relative to the mixture), are extruded to give a 0.8 mm thick film. The plasticizer is composed of a mixture of equal parts by weight of dihexyl, dioctyl and didecyl phthalate. Some properties of the polymers and of the films prepared from them are shown in Table 2.

tion conditions for 3 hours at 55° C. in the presence of 0.2% by weight of sodium/dodecylbenzenesulfonate (relative to the polymer). The resulting polymer has a vinyl alcohol unit content of 17.1% by weight. 0.8 mm thick films of this polymer, which contain 30% by weight of dihexyl phthalate as the plasticizer, have a tensile strength (measured as indicated in Example 1) of 21 N/mm$^2$. If, for comparison, the same polymer is plasticized with 29% by weight of triethylene glycol bis-heptanoate, the 0.8 mm thick film prepared from this material has a tensile strength of only 15 N/mm$^2$.

EXAMPLE 5

In the same way as described in Example 1, two polyvinylbutyrals having a degree of polymerization $P_n$ of about 1,400 are prepared. The composition of the polymers and the concentration of sodium dodecylbenzenesulfonate in the aftertreatment are indicated in Table 3 which follows. The two polymers are processed into 0.8 mm thick films which contain 29% by weight of di-n-hexyl adipate as the plasticizer. Various properties of these films are also described in Table 3.

For the polyvinylbutyral 5(a) produced and plasticized according to the invention as against the polyvinylbutyral of the comparison 5(b), Example 5 not only

TABLE 2

| Example 2 | Polymer | | | Film | | |
|---|---|---|---|---|---|---|
| | Vinyl acetate units in the starting PVA[1] (% by weight) | Sodium alkanesulfonate in the acetalization (parts by weight) | Vinyl alcohol units in the PVB (% by weight) | Melt index | | Strength at 100% elongation (N/mm$^2$) |
| | | | | $i_{10}$ 150° C.[2] (g/10 min.) | $i_{20}$ 80° C.[1] (mg/hour) | |
| (a) according to the invention | <0.1 | 0.6 | 17.2 | 4.2 | 170 | 3.0 |
| (b) (comparison) | 2.1 | 0.6 | 17.0 | 7.6 | 610 | 2.3 |

[1]Determination according to DIN 53735 at 80° C. under a load of 21.6 kg
[2]Determination according to DIN 53735 at 150° C. under a load of 10 kg Example 2 shows that, additionally to the reinforcing action of the alkanesulfonate, an enhancement of the intermolecular forces in the polyvinylbutyral is achieved by further saponification of the polyvinyl alcohol, and this is detectable by the decrease in flowability and the increase in the strength of the films.

EXAMPLE 3

In the same way as described in Example 2, polyvinylbutyral free of acetyl groups is prepared and treated under acetalization conditions with 0.4 part by weight of sodium pentadecylsulfonate per 100 parts by weight of polyvinylbutyral for 5 hours at 60° C. This gives a polymer with 17.3% by weight of vinyl alcohol units. A mixture of 70 parts by weight of this polyvinylbutyral with 30 parts by weight of dioctyl phthalate is compression-molded to give a 0.9 mm thick film. Laminated glass of 30×30 cm size is produced from the film in a known manner with 3 mm thick float glass. In the drop test according to DIN 52306 with a steel ball of 2.26 kg weight, the clear laminates give a mean fracture height of 9.1 m.

EXAMPLE 4

A polyvinylbutyral having a degree of polymerization $P_n$ of about 1,400 and a vinyl acetate unit content of less than 0.1% by weight is aftertreated under acetalizashows an advantageous change in flow at 80° C. and an increase in strength but also a reduction in tackiness.

EXAMPLE 6

Two polyvinylbutyrals having a degree of polymerization $P_n$ of about 1,350, which have been prepared from the same polyvinyl alcohol, which in one case was further saponified as described in Example 1 and, in the other case, was not further saponified, under otherwise the same conditions, are aftertreated under acetalization conditions for 5 hours at 60° C. in the presence of 0.38 % by weight (relative to PVB) of octadecylsulfonic acid. After this treatment, the polymer 6(a) according to the invention has a vinyl alcohol unit content of 18.1% by weight and a vinyl acetate unit content of less than 0.1% by weight.

In the comparison product 6(b), the corresponding values are 17.9 and 1.7% by weight respectively. From both polymers, 0.8 mm thick films are prepared together with 26% by weight (relative to the film) of a plasticizer which is composed of 8 parts by weight of di-n-hexyl adipate and 2 parts by weight of di-2-ethylhexyl adipate. The film produced from the polymer 6(a) according to the invention has a tackiness of 400 seconds, whereas the tackiness of the comparison film 6(b) is substantially higher at 1,500 seconds.

TABLE 3

| Example 5 | Polymer | | | Film | | | | |
|---|---|---|---|---|---|---|---|---|
| | Vinyl acetate units in the starting PVA[1] (% by weight) | Sodium sulfonate in the acetalization (parts by weight) | Vinyl alcohol units in the PVB (% by weight) | Melt index | | Strength at 100% elongation[3] (N/mm$^2$) | Film tackiness[4] (sec.) |
| | | | | $i_2$ 190° C.[1] (g/10 min) | $i_{20}$ 80° C.[2] (mg/hour) | | |
| (a) (according to the invention) | 0.2 | 0.35 | 16.9 | 4.8 | 215 | 1.5 | 600 |
| (b) (comparison) | 1.9 | 0.35 | 17.0 | 4.8 | 1075 | 1.1 | 800 |

[1]Determination according to DIN 53735 at 190° C. under a load of 2.16 kg
[2]Determination according to DIN 53735 at 80° C. under a load of 21.6 kg
[3]Determination according to DIN 53455 after conditioning at 23° C. and 50% relative humidity, drawing rate 20 cm/minute, clamping length 50 mm, width of the measurement strip 15 mm.
[4]Determination according to Europeon Patent 0,000,699, page 5.

EXAMPLE 7

The same polyvinylbutyrals 6(a) and 6(b) as produced in Example 6 are then plasticized, subsequent to the aftertreatment described there, with 30% by weight (relative to the mixture) of di-n-hexyl phthalate and each processed to give a 0.8 mm thick film. The films have the following properties:

TABLE 4

| Example 7 | Film | | |
|---|---|---|---|
| | Melt index[1] $i_2$ 190° C. (g/10 min.) | Tensile strength[3] (N/mm$^2$) | Film tackiness[4] (sec.) |
| (a) (according to the invention) | 24 | 290 | 1900 |
| (b) (comparison) | 31 | 270 | 6000 |

[1]Determination according to DIN 53735 at 190° C. under a load of 2.16 kg
[3]Determination according to DIN 53455 after conditioning at 23° C. and 50% relative humidity, drawing rate 20 cm/minute, clamping length 50 mm, width of the measurement strip 15 mm.
[4]Determination according to European Patent 0,000,699, page 5.

EXAMPLE 8

In accordance with the method described in Example 1, three different polyvinylbutyrals are prepared from the same polyvinyl alcohol which has a degree of polymerization $P_n$ of about 1,450 and a vinyl acetate unit content of 1.6% by weight.

A polymer 8(a) according to the invention is obtained by reducing the vinyl acetate unit content to less than 0.1% by weight, before the start of the acetalization, by the addition of NaOH as described in Example 1.

The reaction is initiated by the addition of n-butyraldehyde to the polyvinyl alcohol solution, containing hydrochloric acid, in the same way as described in Example 1. The temperature sequence in the acetalization is 1 hour at 16° C., heating to 60° C. within 2 hours and 5 hours stirring at this temperature, 0.09% by weight of pentadecylsulfonic acid being present for some of the time. Details can be taken from Table 5 which follows. Otherwise, the acetalization and working-up take place as described in Example 1. The polyvinylbutyrals obtained are each plasticized with 29% by weight of di-n-hexyl adipate and processed into 0.8 mm thick films. The properties of these films are described in Table 5.

TABLE 5

| Example 8 | Polymer | | | | Film | | | |
|---|---|---|---|---|---|---|---|---|
| | Vinyl acetate units in the starting PVA[1] (% by weight) | Quantity of n-butyraldehyde used (g/100 g of PVA[1]) | $C_{15}$-alkane-sulfonic acid in the aftertreatment (% by weight, relative to PVB) | Vinyl alcohol units in the PVB (% by weight) | Melt index[2] $i_{20}$ 80° C. (mg/hour) | Tensile strength[3] (N/mm$^2$) | Strength at 100% elongation[3] (N/mm$^2$) | Film tackiness[4] (sec.) |
| (a) (according to the invention) | 0 | 60.5 | 0.09 | 19.1 | 6 | 24.5 | 2.7 | 270 |
| (b) (comparison) | 1.6 | 59.0 | 0.09 | 19.2 | 260 | 22.5 | 2.1 | 1000 |
| (c) (comparison) | 1.6 | 60.0 | 0 | 18.7 | 1600 | 17.5 | 0.6 | 16000 |

[2]Determination according to DIN 53735 at 80° C. under a load of 21.6 kg.
[3]Determination according to DIN 53455 after conditioning at 23° C. and 50% relative humidity, drawing rate 20 cm/minute, clamping length 50 mm, width of the measurement strip 15 mm.
[4]Determination according to European Patent 0,000,699, page 5.

We claim:

1. A process for preparing thermoplastic plasticized polyvinylbutyral molding composition which comprises the following steps:
   (1) acetalizing polyvinyl alcohol with n-butyraldehyde in aqueous phase with an acid catalyst,
   (2) aftertreating obtained polyvinylbutyral under acetalization conditions in aqueous phase at an elevated temperature with an emulsifier,
   (3) isolating and purifying the resulting polyvinylbutyral, and
   (4) mixing the thus obtained polyvinylbutyral with plasticizer, wherein the polyvinylalcohol employed is one which has less than 0.5% by weight of vinyl acetate units, and its aqueous solution has been cooled to a temperature below 20° C.,
   acetalizing is initially conducted at a temperature below 20° C. and is subsequently effected at a temperature of from 20° to above 40° C., to obtain polyvinylbutyral the aftertreating emulsifier is an organic sulfonic acid having from 8 to 30 C atoms or a salt thereof, the aftertreating is effected at from 50° to 70° C. for from 0.5 to 10 hours to obtain a polyvinylbutyral having a residual vinyl alcohol content of from 15 to 21% by weight, the plasticizer is at least one member selected from the group consisting of (a) an ester of phthalic acid with a linear or branched $C_6$-$C_{10}$-alcohol or a mixture of such alcohols and (b) an ester of adipic acid with a linear or branched $C_6$-$C_{10}$-alcohol or a mixture of such alcohols, and the amount of plasticizer is from 20 to 40% by weight, relative to the weight of the polymer/plasticizer mixture.

2. A process which comprises molding the molding composition prepared as claimed in claim 1.

3. A process as claimed in claim 1 wherein the polyvinylbutyral obtained by step (3) has a viscosity (measured according to DIN 53015 at 23° C. on a 5% by weight solution in ethanol) of between 10 and 200 mPa.s.

4. A process as claimed in claim 1 wherein the polyvinylbutyral obtained by step (3) has a residual vinyl alcohol content of from 16 to 20% by weight.

5. A process as claimed in claim 1 wherein the emulsifier of step (2) comprises up to 1% by weight (based on the weight of the resulting polyvinylbutyral) of the organic sulfonic acid or of a salt thereof.

6. A process as claimed in claim 5 wherein step (2) is effected in the presence of 0.01 to 0.5% by weight of the organic sulfonic acid or of a salt thereof.

7. A process as claimed in claim 2, wherein the weight ratio of the plasticizer components is (a) : (b) = 100 to 90:0 to 10 or 0 to 10:100 to 90.

8. A process as claimed in claim 2 which comprises molding the thermoplastic plasticized polyvinylbutyral molding composition to give a film of high strength.

9. A thermoplastic plasticizer polyvinylbutyral molding composition prepared as claimed in claim 1.

10. A high-strength thermoplastic plasticizer polyvinylbutyral film prepared as claimed in claim 8.

11. A process for preparing thermoplastic plasticized polyvinylbutyral molding composition which comprises the following steps:

(1) cooling to a temperature below 20° C. an aqueous solution of polyvinyl alcohol having less than 0.5% by weight (based on the total weight of the polyvinyl alcohol) of vinyl acetate units, (2) initiating acetalization of the polyvinyl alcohol with n-butyraldehyde in aqueous phase with an acid catalyst while the aqueous solution is at temperature below 20° C., (3) continuing the aqueous-phase acid-catalyzed acetalization within a temperature range of from 20° to 40° C. to obtain polyvinylbutyral, (4) aftertreating the polyvinylbutyral under acetalization conditions in aqueous phase for from 0.5 to 10 hours within a temperature range of from 50° to 70° C. with an organic sulfonic acid emulsifier having from 8 to 30 C atoms, or a salt thereof, (5) isolating the resulting polyvinylbutyral, and (6) mixing the obtained isolated polyvinylbutyral with from 20 to 40% by weight, relative to the weight of the polymer/plasticizer mixture, of plasticizer selected from the group consisting of (a) an ester of phthalic acid with a linear or branched $C_6$-$C_{10}$-alcohol or a mixture of such alcohols and (b) an ester of adipic acid with a linear or branched $C_6$-$C_{10}$-alcohol or a mixture of such alcohols.

12. A process according to claim 11 which further comprises adding to the aqueous solution of step (1), prior to initiating acetalization, an organic sulfonic acid having an emulsifying action or a salt thereof.

13. A process according to claim 11 which further comprises adding dodecylbenzenesulfonate, to the aqueous solution of step (1) prior to initiating acetalization.

* * * * *

UNITED STATES PATENT AND TRADEMARK OFFICE
CERTIFICATE OF CORRECTION

PATENT NO. : 4,970,253

DATED : November 13, 1990

INVENTOR(S) : HERMANN, et al.

It is certified that error appears in the above-identified patent and that said Letters Patent is hereby corrected as shown below:

Title page, left column, "[73] Assignee: Hoechst...Patentabteilung" should read —[73] Assignee: Hoechst Aktiengesellschaft—. Column 10, line 67 (claim 1, line 18), "40°C.," should read —40°C.—; line 68 (claim 1, line 19), "polyvinylbutyral" should read —polyvinylbutyral,—. Column 12, line 1 (claim 9, line 1), "plastizer" should read —plasticized—; line 3 (claim 10, line 1), "plasticizer" should read —plasticized—; line 39 (claim 13, line 2), ", to" should read —to—.

Signed and Sealed this

Twenty-eighth Day of July, 1992

Attest:

DOUGLAS B. COMER

*Attesting Officer*   *Acting Commissioner of Patents and Trademarks*